Aug. 1, 1950

M. N. YARDENY 2,517,155

MULTIREVOLUTION CONTROL APPARATUS

Filed April 19, 1946

MICHEL N. YARDENY
INVENTOR.

BY Leon H. Amdur

ATTORNEY

Aug. 1, 1950

M. N. YARDENY

2,517,155

MULTIREVOLUTION CONTROL APPARATUS

Filed April 19, 1946

MICHEL N. YARDENY
INVENTOR.

BY Lum H. Amdur

ATTORNEY

Patented Aug. 1, 1950

2,517,155

UNITED STATES PATENT OFFICE 2,517,155

MULTIREVOLUTION CONTROL APPARATUS

Michel N. Yardeny, New York, N. Y.

Application April 19, 1946, Serial No. 663,379

7 Claims. (Cl. 318—33)

This invention relates to control systems for energizing a motor to move an object or load to a predetermined position. The motor in such systems may be, and usually is, reversible so that the object or load may be moved in either direction.

The object of the invention is to provide a system of the character described in which the object or load may move: (a) through an angle less than a complete circle or revolution, or (b) through one or more complete revolutions, or (c) through one or more complete revolutions plus an angle less than a complete revolution (i. e., a partial revolution). An allied object is to provide a control system for moving a load through complete and/or partial revolutions, to a predetermined end position. Another object of the invention is to provide a control system which may be pre-set to move a load through a complete and/or partial revolution to a predetermined end position, which will, upon closing a switch, move the load through the required number of complete revolutions and, where an additional partial revolution is preset, through the particular pre-set angle, to the pre-set predetermined end position.

A still further object of the invention is to provide a control system as described having a plurality of selectors, respective ones of which may be pre-set to move the load through complete and/or partial revolutions to different predetermined end positions, which will, upon closing the switch associated with a particular one of the plurality of selectors, move the load through the required number of complete revolutions and/or partial revolutions, to bring it to the pre-set end position of that particular selector.

According to the invention, these objects are accomplished by the feature that a complete cycle (revolution) unit and a partial cycle (revolution) unit are provided, that each unit has a member selectively adjustable to cause movement of the load by the motor in a predetermined direction, the selectively adjustable member of the complete cycle unit being adjusted a number of unit distances corresponding to a predetermined number of complete cycles of movement through which the load is to be moved, the selectively adjustable member of the partial cycle movement being selectively adjusted an extent depending upon the predetermined partial cycle of movement through which the load is to be additionally moved, and that the complete cycle unit is connected to be energized to move the load in a predetermined direction for a predetermined number of complete cycles of movement and to cause the partial cycle unit to be energized to continue load movement in the predetermined direction for the predetermined additional partial cycle of movement.

In the previous statements particular reference has been made to rotary movements of the load, however, it should be understood that the invention is equally applicable to other cycles of movement, such as a linear movement of the load.

The present application is a continuation in part based on my co-pending application Ser. No. 509,555, filed November 9, 1943, now abandoned.

For the attainment of the foregoing and such other objects of invention as may appear or be pointed out herein, a number of embodiments of the invention are shown in the accompanying drawings, wherein.

Figure 1:
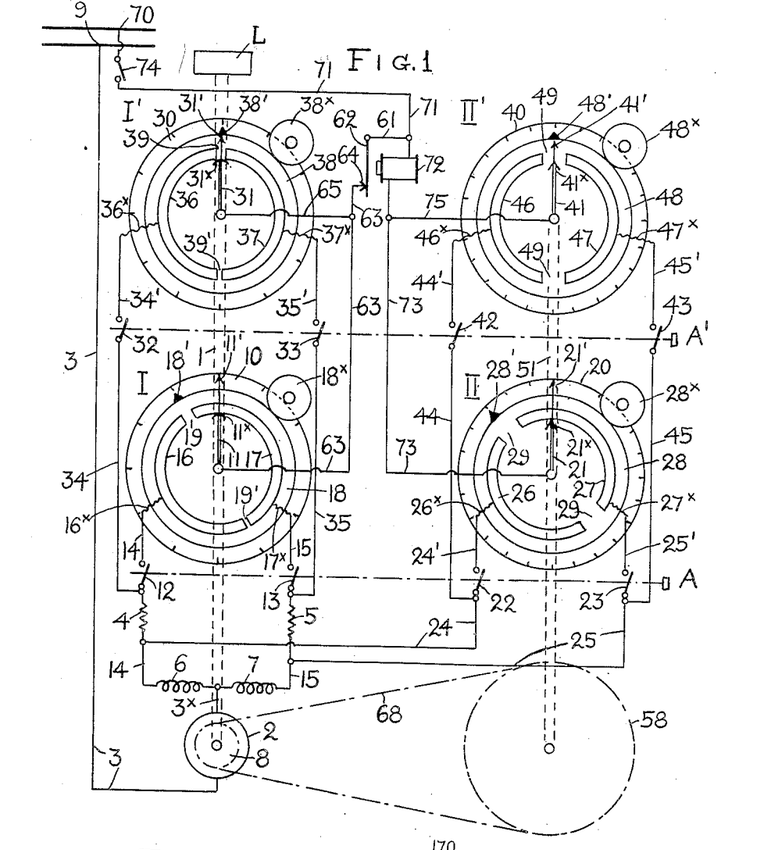
Fig. 1 is a diagrammatic illustration of an improved multi-revolution control apparatus provided with two selectors, in which no relays are interposed between the motor (incidently, a series motor) and the selector units and in which resistor elements are provided to slow down motor speed during operation of the partial revolution units.

The embodiment of the invention shown in Fig. 1 illustrates two selectors, namely, I—II and I'—II', each consisting of a partial revolution unit, respectively, I, I', and a complete revolution unit, respectively II, II'. Each of the units I, II and I', II' comprises a pair of relatively movable members, namely, a contact arm and an insulated disc designated in the four units as follows: Contact arm 11 and insulated disc 18 (unit I), arm 21 and disc 28 (unit II), 31 and 38 (unit I') and 41 and 48 (II'). The contact arms of the partial revolution units (I') of both selectors I—II and I'—II', namely, 11 and 31 are secured on a common shaft 1, while the contact arms of the complete revolution units (II, II') of both selectors 21 and 41 are secured on a common shaft 51. It should be pointed out at this time that the improved device of Fig. 1 may have a single selector (I—II), instead of the two selectors shown, or it may have a larger number of selectors, in which case the common shafts 1, 51 would be extended to accommodate the additional selectors. The insulated discs of the various units are rotatively mounted on the shafts, for pre-setting adjustment (as will be described), the insulated discs 18 and 38 of the partial revolution units I, I' being on shaft 1 while discs 28 and 48 of the complete units II, II' are on shaft 51.

Each of the two insulated discs of each selector is provided with a pair of electrical conducting elements in the form of segments separated at adjacent ends by a gap, designated in the four units as follows: Segments 16 and 17 separated by gaps, 19, 19' (unit I), segments 26 and 27 and gaps 29 (unit II), 36, 37 and gaps 39, 39' (I'), and 46, 47 gaps 49 (II'). The four contact arms 11, 21, 31, 41, are provided with contacts, respectively, 11$^\times$, 21$^\times$, 31$^\times$, 41$^\times$ which are slidably engageable with the conducting segments, respectively, 16—17 (unit I), 26—27 (II), 36—37 (I'), and 46—47 (II'). The gaps 19, 39 of the partial revolution units I, I' are narrow so that the contact of their respective contact arms is adapted to "bridge the gap" and engage both segments (as is shown in unit I'), whereas the gaps 29, 49 of the complete revolution units II, II' are wide so that the contact of their respective contact arms is incapable of engaging both segments simultaneously (see unit II'). The contacts 11$^\times$, 31$^\times$, of arms 11, 31 of the partial revolution unit I—II, may be made narrow so as not to bridge their respective gaps 19, 39—the distinction in operation between contacts which bridge the gap and those which do not, will be subsequently explained—but the gaps 29, 49 of the discs 28, 48 of the complete revolution units II, II', must always be made wide for a reason which will be subsequently explained.

The segments 16, 17 of partial revolution unit 1 of selector I—II are connected, in a manner permitting rotation of their disc 18 (conventionally shown by flexible leads 16$^\times$, 17$^\times$), to leads, respectively 14, 15 connecting to respective switches 12, 13 and through resistance elements 4, 5 to the outside terminals of the reversing field windings, respectively 6, 7, of a load motor 2. The segments 36, 37 of the other partial revolution unit I' associated with selector I'—II' are connected by flexible leads 36$^\times$, 37$^\times$ and leads 34', 35' to switches, respectively, 32, 33 and through leads 34, 35 to the aforesaid resistance elements 4, 5. The segments 26, 27 of complete revolution unit II of selector I—II are connected through flexible leads 26$^\times$, 27$^\times$, to short leads 24', 25', switches 22, 23 to wires 24, 25 connected to the aforesaid short leads 14', 15' associated with the partial revolution units I, I' and leading to the field windings 6, 7, as described above. The segments 46, 47 of the other complete revolution unit II' associated with selector I'—II' are connected by flexible leads 46$^\times$, 47$^\times$ and leads 44', 45' to switches, respectively 42, 43 and through leads 44, 45 to the aforesaid leads 24, 25 associated with the unit II.

The switches 12, 13 of the partial revolution unit I and the switches 22, 23 of complete revolution unit II, of selector I—II, are operated by a gang switch A; the switches 32, 33 of the partial revolution unit I' and the switches 42, 43 of complete revolution unit II', of selector I'—II', are operated by a gang switch A'.

The contact arms of the four units I, I', II, II' are connected to one terminal 70 of a current source in the following manner: From a switch 74 at terminal 70, lead 71 connects through the coils of a master relay 72 to a second lead 73 which leads to contact arm 21 of unit II. From wire 73, a lead 75 branches off to connect to contact arm 41 of unit II'. A short lead 61 branches off the aforesaid lead 71 to connect to the armature 62 of master relay 72. When relay 72 is deenergized, its armature 62 is spring-pressed into engagement with contact 64 on a lead 63 extending to contact arm 11 of unit I, with a lead 65 branching off to contact arm 31 of unit I'. The circuit from supply terminal 70, either through the coils of master relay 72 to contact arms 21, 41 of the complete revolution units II, II' or through relay armature 62 to contact arms 11, 31 of the partial revolution units I, I', is completed, by engagement of the respective contact arms with their associated segments, to the reversing field windings 6, 7 of motor 2, as will be more fully described; but at this time it suffices to say that the circuit is connected from the common terminal of the windings by a short lead 3$^\times$ through the motor armature to a wire 3 leading to the other terminal 9 at the source of current supply.

Motor shaft 1, which drives the load L and to which the contact arms 11, 31 of the partial revolution units I (of selector I—II) and I' (of selector I'—II') are secured, drives the shaft 51 to which the contact arms 21, 41 of the complete revolution units II and II' are secured, by means of a sprocket gear 8, secured on shaft 1 and a chain 68 which links sprocket gear 8 to a sprocket gear 58 secured on the other shaft 51. The driven sprocket gear 58 is considerably larger than the driving sprocket gear 8, so that the partial revolution shaft 1 makes several revolutions during a single revolution of complete revolution shaft 51. The four units shown, I, I', II, II', are provided with stationary circular scales, respectively 10, 30, 20 and 40 marked off in indications read by pointers, respectively, 18' (on disc 18), 38' (disc 38), 28' (disc 28) and 48' (disc 48). The scales 10 and 30 of the partial revolution units I, I' are marked off in degrees of a circle, while the scales 20 and 40 of the complete revolution units II, II' are marked off in number of revolutions, each mark on scales 20, 40 representing a complete revolution of the partial revolution units, respectively, 10, 30. Not only the insulated discs but also the contact arms 11, 21, 31, 41, are provided with pointers, respectively, 11', 21', 31', 41' reading on the said stationary scales.

Where the remote control system of Fig. 1 is to be used for moving the load to a single predetermined position, one of the selectors, I—II, I'—II', is employed; where the load is to be moved to two predetermined positions, both selectors are used; as stated above, there may be more selectors to accommodate a greater number of desired load positions. The selectors are pre-set in accordance with the required load movement by manually turning and setting the proper insulated discs.

To facilitate turning of the discs of the respective units, each disc 18, 28, 38, 48 may be provided with a manipulative knob, respectively 18×, 28×, 38×, 48×, in frictional or toothed engagement with the discs.

Selector I', II' is shown in Fig. 1 with the contact arm 31 of partial revolution unit I' and the contact arm 41 of complete revolution unit II', and also their insulated discs 38 and 48, at the zero position of the units (I' and II') of selection, which position is conveniently taken at 1200 o'clock. The contact arm 11 of unit I being secured to the same shaft as contact arm 31 of unit I', the arms of the partial revolution units are always in a fixed angular relation to one another; this is also true of the contact arms 21 and 41 of the complete revolution units II, II' which are secured on the shaft 51. Inasmuch as the contact arms 31, 41 both point to zero position, so will the remaining contact arms 11, 21.

Assuming that the desired load movement calls for three complete revolutions in a counter-clockwise direction plus an additional movement of 30° of a circle and that selector I—II is pre-set for this load movement (as shown in Fig. 1). Disc 28 of the complete revolution unit II is turned counter-clockwise to bring its index 28' in alignment with the third mark on scale 20 (indicating three complete revolutions) and the disc 18 of the partial revolution unit I is turned counter-clockwise to bring its index 18' in alignment with the first mark on scale 10 (indicating 30°). Counter-clockwise turning of the discs 18, 28 brings their respective gaps 19, 29 in alignment with the aforesaid marks on the respective scales 10, 20 and causes the engagement of the contact arm 11 of unit I with segment 17 and engagement of the contact arm 21 of unit II with segment 27, it being assumed that both contact arms 11, 21 are at zero (12:00 o'clock) as shown. Since selector I-II is to be operative and selector I'-II' inoperative, gang switch A is pushed leftwardly to close the switches 12, 13 22, 23 of selector I'-II'. After having pre-set selector I—II, as described, the load may be moved to the position corresponding to this setting of the selector by simply closing main switch 74. This causes current to pass through field winding 7 and the motor armature, to rotate the motor in the desired direction, which is counter-clockwise, through a circuit which may be traced from one terminal 70 of the source, closed switch 74, lead 71 to master relay 72, from whence, through lead 73 to contact arm 21 of complete revolution unit II, the engaged segment 27, flexible lead 27×, lead 25', closed switch 23, wire 25, to winding 7, from whence, through short lead 3×, through the motor armature and by lead 3 back to the other terminal 9 at the current source.

It should be noted that the energization of master relay 72 (in the circuit to motor winding 7, just traced) attracts relay armature 62 to open the circuit which would otherwise be completed through contact arm 11 of the partial revolution unit I (which circuit will be traced subsequently).

Energization of winding 7 causes rotation of motor 2 to turn shaft 1 and the load in the desired counter-clockwise direction. Counter-clockwise rotation of shaft 1 also causes counter-clockwise rotation of shaft 51, but at a reduced rate because of the aforesaid drive ratio between the shafts. Hence, as motor 2 continued rotation, contact arm 21 of the complete revolution unit II turns counter-clockwise towards gap 29 separating segments 27, 26 of insulated disc 28. Rotation continues until contact arm 21 reaches gap 29 (which, as already described, has been aligned with the third mark on scale 20 indicating three complete revolutions by the pre-setting of disc 28), whereat the circuit to winding 7 is broken and all rotation ceases; the load will have been moved, at this time, the required three complete revolutions.

Deenergization of master relay 72 releases its armature 62 to complete the circuit to contact arm 11 of the partial revolution unit I, which may be traced from terminal 70, closed switch 74, wire 71, short lead 61, relay armature 62, contact 64, wire 63 to contact arm 11 on partial revolution unit I, engaged segment 17, flexible lead 17×, lead 15, closed switch 13, resistor 5, to the same winding 7, from whence through the motor armature and back via wire 3 to the other terminal 9. Motor 2 will thus continue its counter-clockwise rotation which will continue until contact arm 11 reaches the gap 19, separating segments 16, 17 of insulated disc 18 (which as already described has been aligned with the first mark on scale 10, indicating 30° of a circle), whereat both field windings 7 and 6 are energized and motor rotation stopped (by suppression of the field); the load will have been moved at this time through an additional partial revolution of 30°.

It should be noted at this time that the motor when under control of the complete revolution unit II, is stopped when contact arm 21 of that unit reaches gap 29 of the insulated disc 28, at which time the winding 7 is deenergized. On the other hand, the motor when under control of the partial revolution unit I, is stopped when contact arm 11 of the unit reaches gap 19, of the insulated disc 18, such motor stopping is caused not by deenergization of winding 7 as in the case of the complete revolution unit II, but by the energization of both windings 7 and 6, which causes suppression of the field. The circuit to winding 7 during the operation of the partial revolution unit I, has already been described. The circuit to the other winding 6, may be traced when contact 11× of the contact arm 11 of unit I, bridges gap 19, from the said contact arm to engage segment 16, flexible lead 16×, lead 14, closed switch 12, resistor 4 to field winding 6, from whence through short lead 3× to the motor armature and back via wire 3 to the other terminal 9.

In the arrangement shown in Fig. 1 contacts 11× (31×) of the contact arms 11 (31) are made wide so as to bridge the gaps 19 (39) and thus engage both segments 16, 17 (36, 37) to energize both field windings 6, 7 to stop the motor. As intimated above, the contacts 11× (31×) may be made narrow so as not to bridge the gap 19 (39) but to break off engagement with both segments 16, 17 (36, 37), and thus break the circuit to the windings 6, 7 in which case the motor will likewise be stopped. Irrespective of the arrangement used for the partial revolution unit I (I'), the gap 21 (41) of insulated disc 28 (48) of the complete revolution unit II (II'), must always be considerably larger than gap 19 (39) of unit I (I') for the following reason: When contact arm 21, of complete revolution unit II, in moving counter-clockwise (in the example assumed) leaves engagement with segment 27, the other unit I comes into operation as already described. However, during the operation of the partial revolution unit I, not only will its contact arm 11 be rotated, but also the contact arm 21 of the other unit II, by reason of the driving connection between shafts 1, 51. The gaps 29, 29 of unit II, are made sufficiently wide so that the contact arm 21 in turning counter-clockwise during the operation of the partial revolution unit I, will not reach the other segment 26 of insulated disc 28. More specifically, the width of the gaps 29, 29 is such that the contact arm 21, may sweep across the arc sub-tended by the gap 29, during a complete or 360° revolution of the partial revolution unit I, without touching either of the segments 26, 27.

The aforementioned resistor elements 4 and 5 have two purposes, one of which will now be described: During the operation of unit II, in causing the load to be moved to the required number of complete revolutions, the contact arm 11 of the partial revolution unit I, as well as the contact arm 21 of the complete revolution unit II, will be rotated counter-clockwise by the rotation of the motor in that direction. It will thus be seen as the contact arm 11 rotates, its contact 11× will periodically bridge the gaps 19, 19; more specifically during the three complete revolutions of the example, the contact arm 11 of unit I, will sweep across the gaps 19, 19 a total of six times. Each time either of the gaps 19, 19 is bridged and the contact 11× engages both segments 16, 17 simultaneously, there will be an energization of both windings 6 and 7 (the circuit to which has already been traced above in connection with the partial revolution unit I). One of the purposes served by the resistor elements 4, 5, is to prevent stopping of the motor each time contact arm 11 bridges one of the gaps of insulator disc 18. When contact arm 11 bridges a gap 19 with its contact 11× and engages both segments 16, 17, a circuit will be completed which may be traced from the outside terminal of the field winding 7 (which is energized by the circuit completed through the complete revolution unit II), through resistor element 5, closed switch 13, lead 15, flexible lead 17× to segment 17, across the bridging contact 11×, to the other segment 16, the circuit continuing through flexible lead 16×, lead 14, closed switch 12, resistor element 4, to the other winding 6, back to the inside terminal of the aforesaid energized field winding 7. Thus the field winding 6, will also become energized. However, it will be noted that the "sneak" circuit just traced from both sides of the energized winding 7, includes the two resistor elements 4, 5; the ohmic value of the two resistor elements 4, 5, is such that the current circulating through the aforesaid sneak circuit, will be reduced to such an extent that it will not energize field winding 6 sufficiently to influence the motor rotation caused by the directly energized winding 7. Where the contact 11× of the partial revolution unit I, is made narrow so as not to bridge the gap, there is no need for the resistor elements 4, 5 inasmuch as the narrow contact 11× will not connect the segments 16, 17.

The second purpose providing the resistor elements 4, 5 is to reduce the speed of rotation of the motor during the time that it is under control of the partial revolution unit I, in order that the speed of the rotating parts may be brought down to a reduced level to facilitate the stopping of the moving parts when the stopping point is approached. (This stopping point occurring, as already described, when contact arm 11, of the partial revolution unit I, approaches the gap 19, at the pre-set position of insulated disc 18, which is as shown in Fig. 1 at the first or 30° mark of scale 10). The resistor elements 4 or 5 are effective to reduce the speed of the motor when under control of unit I, by reason of the fact that one or the other is included in the circuit (already traced), to one or the other of the windings 6, 7 depending upon direction of motor rotation. It should be pointed out that at this time only one of the resistor elements either 4 or 5 is included in the circuit to the respective field windings 6, 7, and that the ohmic values of the resistor elements is such that while the inclusion of both resistor elements 4, 5 in a circuit to a field winding would reduce the current to an extent preventing the particular winding from influencing motor rotation, as was seen in connection with the above explanation of the first purpose served by the resistor elements, the inclusion of a single resistor element whether 4 or 5, will reduce the speed at which the motor rotates.

Figure 2:
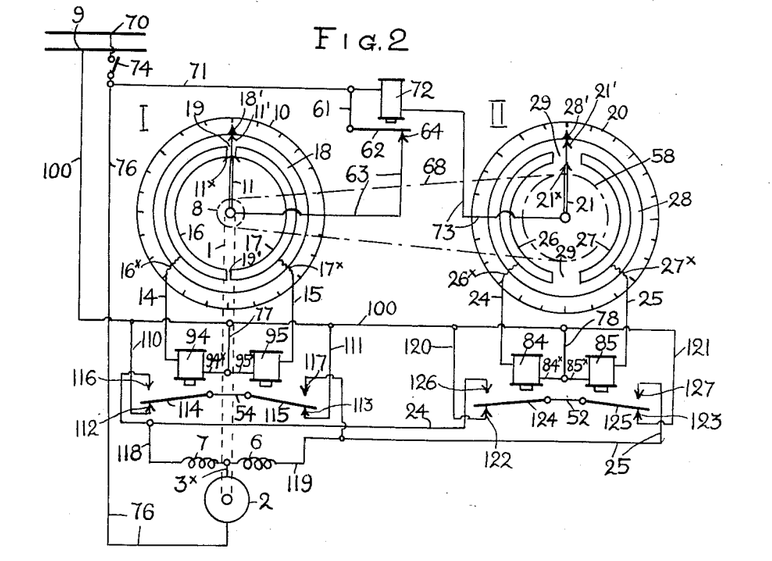
Fig. 2 is a diagrammatic illustration of a similar apparatus, showing only one selector, and having a pair of relays interposed between the motor (a series motor) and the complete and partial revolution units.

In Fig. 2 an embodiment of the invention is shown similar to that already described with reference to Fig. 1, except that, instead of energizing the reversing windings (6, 7, in Fig. 1), directly from the respective segments 16, 17 of unit I, 26, 27 of unit II etc., the motor windings (also designated 6, 7, in Fig. 2, although they are in reversed position) are energized through the medium of relays, which in turn are connected to the respective segments of the insulated discs of the various units. Only selector I—II is shown in Fig. 2, although, it is apparent that the invention may be applied to a plurality of selectors which would be connected as already seen in Fig. 1. The same reference characters have been applied in Fig. 2 as were used and described with reference to Fig. 1, so that the description of much of Fig. 2, need not be here repeated; the difference in the systems of the two figures concerns the provision of a pair of relays 94, 95, interposed between the field windings 6, 7 of the motor and partial revolution unit I and the provision of a second pair of relays 84, 85 between the windings and complete revolution unit II. The outside terminals of the pair of relays 94, 95 are connected, respectively, to the segments 16, 17 of insulated disc 18 of unit I, through leads, respectively, 14, flexible lead 16×, and lead 15, flexible lead 17×; the inside terminals of the two relays are connected by short leads 94×, 95× and a lead 77 to a wire 100 which leads back to one terminal 9 of the current supplied. The pair of relays 84, 85 are similarly connected to respective segments 26, 27 of insulated disc 28 of the complete revolution unit II, the inside terminal of the relays being connected by a common lead 78 to the aforesaid supply wire 100.

The armatures 114, 115 of the respective relays 94, 95 are engaged when their respective relays are deenergized with contacts 116, 117, contact 116 being connected through lead 118 to the outside terminal of field winding 7, while contact 117 is connected by lead 119 to field winding 6; the circuit is continuing from the common tap of the windings through short lead 3×, and the motor armature and wire 76 back through switch 74, to the other terminal 70 of the source of supply. The armatures 124, 125 of the other pair of relays 84, 85 are similarly arranged, and in the deenergized condition of their respective relays, engage, respectively, a contact 126 which is connected by lead 24 to the aforesaid lead 118, and contact 127, is connected by lead 25, to the aforesaid lead 119.

The insulated discs 18, 28 of the selector, are pre-set in the manner similar to that explained in connection with Fig. 1, and the motor rotates contact arm 11, 21, as in the manner already explained. Assuming that a counter-clockwise rotation of the load motor 2 is called for, and that the extent of movement involves more than a complete revolution, both discs are adjusted in a counter-clockwise direction so that contact arm 21, of the complete revolution unit II, engages segment 27, and contact arm 11, of the partial revolution unit I, engages segment 17. Upon closing the main switch 74, a circuit will be completed through the relay 85 associated with the complete revolution unit II, the energization of the master relay 72 breaking the circuit to the other unit I. Energization of relay 85 attracts its armature 125 into engagement with contact 123 to complete a circuit to field winding 7, which may be traced from supply terminal 9, wire 100, lead 121, contact 123, the attracted armature 125, and a short lead 52 connecting the two relay armatures, to armature 124 (which is in unattracted position since its relay 84 is deenergized), engaged with contact 126, and through lead 24, and lead 118 to the outside terminal of field winding 7. Energization of winding 7 causes the motor 2 to rotate in a counter-clockwise direction which continues until contact arm 21 of the complete revolution unit II reaches gap 29, leaving engagement with the segment 27, at which time the circuit to relay 85 is broken and its armature 125 released to normal engagement with contact 127, thus breaking the circuit to the motor windings. Energization of the other relay 84 operates in a similar manner to complete the circuit to the other field winding 6 for clockwise rotation, this circuit including lead 100, relay contact 122, attracted armature 124, common lead 52, unattracted armature 125, contact 127 and lead 25. In a manner already described with reference to Fig. 1, when the load has been moved the required number of complete revolutions, and contact arm 21 of the complete revolutions unit II has reached gap 29, master relay 72 is deenergized thus releasing its armature 62 to engage with contact 64 and to complete a circuit to the partial revolution unit I. The respective segments 16, 17 of this unit function in a similar manner to energize the respective relays 94, 95 which in turn attract the armature 114, 115 to complete a circuit to one or the other of motor windings 6, 7.

After completing the required number of complete revolutions, contact arm 21 of the complete revolution unit II leaves engagement with segment 27 to deenergized master relay 72, thus completing the circuit to the partial revolution unit I, in the manner already described in Fig. 1. The partial revolution unit I continues the rotation of the motor in the desired counter-clockwise direction by completing the circuit throuhg the engaged segment 17 to relay 95, thus attracting relay armature 115 to make a circuit from wire 100, lead 111 and contact 113 through the attracted armature, connecting lead 54, unattracted armature 114 of deenergized relay 94 to contact 116, lead 118 to motor winding 7.

It will be noted that the resistors 4, 5 used in the arrangement of Fig. 1, are not employed in the modification shown in Fig. 2. It will be recalled that one of the purposes of these resistors was to prevent a "sneak" current, through a circuit completed each time the contact 11× of the contact arm 11 of the partial revolution unit I bridges gap 19 during the operation of the complete revolution unit 11, from energizing the field winding not functioning for the particular desired direction of rotation. There is no occasion for using such resistors in the modification of Fig. 2, for the reason that the connections from the segments 16, 17 do not extend to the motor windings but go no further than the pair of relays 94, 95 associated with the partial revolution unit I; nor do the connections from the segments 26, 27 of the complete revolution unit II extend to the motor windings, but merely to the pair of relays 84, 85 associated with that unit. An independent circuit, not connected with the relay circuits of the two units, is provided for the motor windings and is connected to supply line 100 by the energization of the relays, as already described. It should be noted that the armatures of both pairs of relays 84, 85 and 94, 95 are included in this independent motor winding circuit and that there is no inter-connection between the relay coil circuits of the two units.

Turning now to the modification shown in Fig. 3, it will be noted that the arrangement is quite similar to that shown and described above in connection with Fig. 2, except for the fact that only a single pair of relays 94, 95 are provided, which are adopted, as will be described, to serve the function of the pair of relays 94, 95 associated with the partial revolution unit I and the pair of relays 84, 85 associated with the complete revolution unit II. The second pair of relays of Fig. 2, viz., relays 84, 85 are dispensed with in the arrangement of Fig. 3, and the segments 26, 27 are connected by respective leads 24, 25 to the leads 14, 15 leading from the corresponding segments 16, 17 of the partial revolution unit I, to the relays 94, 95. Hence the pair of relays 94, 95 will function during the operation of both units I and II. However, in this case, inasmuch as leads 24, 25 from unit II are connected to the leads 14, 15 from unit I, we had the same situation considered in the arrangement of Fig. 1, in which a "sneak" circuit was completed each time contact arm 11 of the partial revolution unit I bridges gap 19 during the operation of the complete revolution unit II. This "sneak" current is thwarted in the modification shown in Fig. 3 by the resistors 4, 5 precisely in the same manner as has been described in connection with the arrangement in Fig. 1. The principal difference between Fig. 1 and Fig. 3 is that in Fig. 1 the segments of the insulated discs of the respective units I, II are connected directly to the field windings, whereas in the arrangement of Fig. 3 these segments are connected to a pair of relays 94, 95, which in turn control rotation of the motor in the manner already described in connection with Fig. 2.

Figure 3:
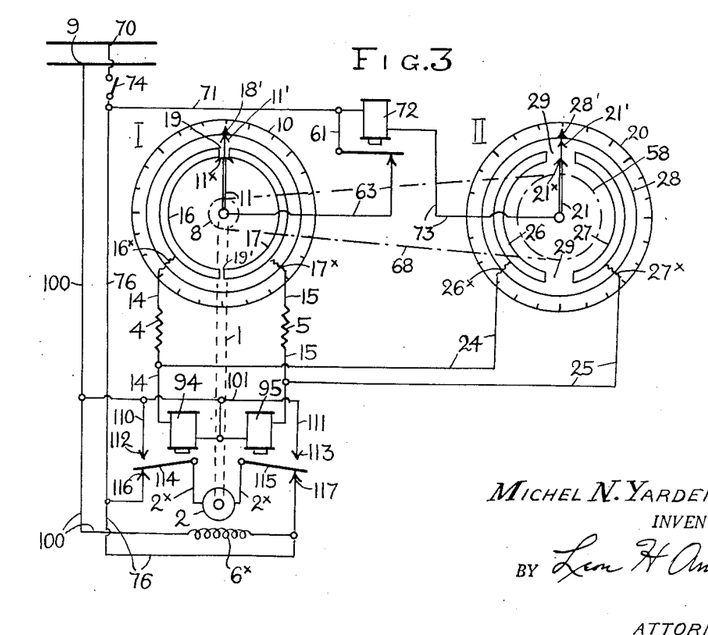
Fig. 3 is similar to Fig. 2 except that a single pair of relays is interposed between the motor (in this case, a shunt motor) and the two units, and provided with resistor elements.

The further purpose served by the resistors 4, 5, in the arrangement of Fig. 1, viz: that of reducing the speed of rotation during the operation of the partial revolution unit I (that is, at a time when the load is approaching its predetermined end point, after completing the required number of complete revolutions), is absent in the modification of Fig. 3; the sole purpose of the resistors 4, 5 in Fig. 3 is to thwart the effects of the aforementioned "sneak" current.

A further distinction between the modifications shown in Fig. 3 and the arrangements of Fig. 1 and Fig. 2, is that, whereas a series motor having a pair of reversible field windings is shown in both Fig. 1 and Fig. 2, in Fig. 3, on the other hand, a shunt motor is provided having a field winding designated 6×. Reversal of direction in the case of a shunt motor shown in Fig. 3, is achieved by changing the direction of the current across the armature. If, for example, relay 95 is energized, a circuit will be completed which is readily traced from one supply terminal 9 to supply wire 100, lead 101, lead 111, relay contact 113, attracted armature 115, short leads 2× through motor armature 2, unattracted armature 114 of the deenergized relay 94, relay contact 116, and to supply wire 76 leading back to the other supply terminal 70.

If supply wire 100 is taken as positive and supply wire 76 as negative, it will be seen from the circuit just traced that the current flows through the motor armature from right to left, more particularly, from relay contact 113 leftwardly through the motor armature to relay contact 116. If, on the other hand, the other relay 94 is energized, a circuit will be completed through the motor armature in the opposite direction, which may be traced from the said positive supply line 100, lead 101, lead 110, relay contact 112, attracted armature 114 of energized relay 94, short lead 2× through the motor armature 2, unattracted armature 115 of deenergized relay 95, to relay contact 117 returning to the other or negative supply line 76. It is thus seen that the current flow in this case is from right to left through the motor armature, more particularly, from relay contact 112 to relay contact 117. The field winding 6× is shunted across the armature by supply wires 76, 100 which lead directly to the source of supply.

It will be noted that when both relays 94, 95 are energized, which occurs when the gap 119 is bridged by contact arm 11 of the partial revolution unit I, at the completion of the required partial revolution, the two armatures 114, 115 will be engaged with the respective relay contacts 112, 113 thus to complete a short circuit through the motor armature 2, which can be traced through leads 110, 111, and the portion of lead 101 between the said two leads 110, 111, the result of which is to quickly stop motor rotation by dynamic braking, the motor armature acting as a generator in the magnetic flux of the energized shunted winding. It might also be noted that dynamic braking will be effective to stop the motor when both relays 94, 95 are deenergized, which would be the case where a narrow contact 11× is used instead of a wider contact which bridges gap 119, which short-circuit is readily traced from the relay contact point 116, the two relay armatures 114, 115 in their unattracted position as shown, through short leads 2× and motor armature 2, and to relay contact 117, returning by the connecting portion of supply wire 76 to the relay contact 116.

Figure 4:
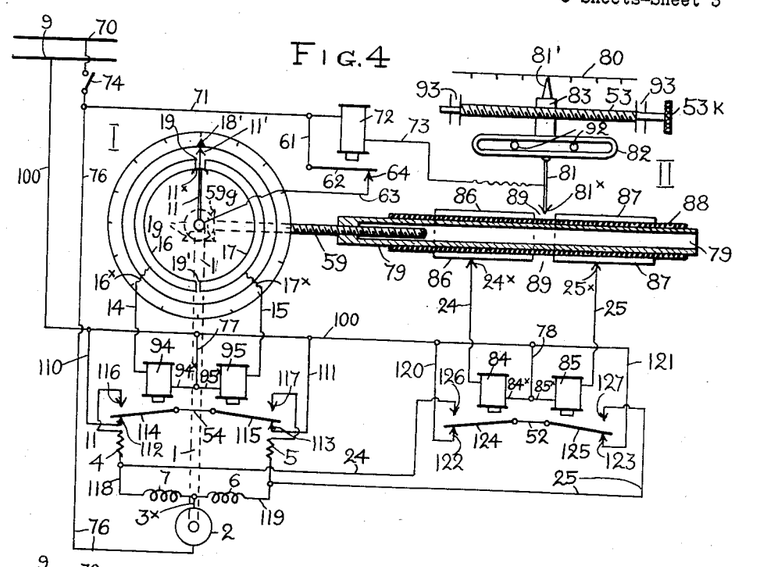
Fig. 4 shows a straight-line unit for complete revolutions, and also slow-down by the use of resistor elements in combination with two pairs of relays, a series motor being shown.

The modification shown in Fig. 4 is similar to that shown in Fig. 2, in that each unit I and II has its own pair of relays, respectively, 94, 95 and 84, 85. It differs from Fig. 2 in that a complete revolution unit II having straight-line movement is used, instead of the units of Figs. 1 to 3 which have rotary movement. Although only the complete revolution unit II is shown with provision for straight-line movement, it is apparent that unit I, or both units, may be so modified. A straight-line movement may also be provided for the load in a similar manner.

As counterparts of the electrically conducting elements 26, 27 of the complete revolution unit II, there is provided in the straight-line modification of Fig. 4 a pair of conducting elements 86, 87 which for convenience is shown in tubular form secured to a tubular member 88, fabricated of suitable insulated material. Member 88 in turn is secured on a tubular member 79, which is supported in a manner to permit axial movement of the assembly, including the aforesaid conducting tubular elements 86, 87. Analogously to the elements of the rotary type of selector units heretofore encountered, the conducting elements 86, 87 are separated from each other to provide a gap 89 which is the counterpart of gap 29 of the rotary type of selector unit. The said inner-supported member 79 is threaded at its left as shown in Fig. 4 to receive the threaded end of a spindle or shaft 59 which is provided at left end with a bevel gear 59g meshing with a bevel gear 1g, secured to rotate with the motor shaft 1.

Cooperative with the conducting elements 86, 87 is the contact 81× of a contact finger 81, being a counterpart of contact arm 21 and its contact 21×, which is secured to a movable member 82 provided with an elongated slot as shown to receive pins or the like 92 secured to the machine frame to permit an extent of rectilinear movement of member 82. Whereas, in the rotary type of selector unit heretofore encountered in which the selector pre-setting is achieved by rotational adjustment of the insulated disc, e. g., disc 28 of the complete revolution unit II, Figs. 1–3, in the straight-line type of selector unit of Fig. 4, it is the contact finger 81 rather than the insulated disc, which is manually pre-set. It will be apparent, however, that this has been done merely for facilitating the illustration; the straight-line type of selector could be arranged to provide for pre-setting of the insulated member 88 and its pair of conducting elements 86, 87. To facilitate the selective adjustment of contact finger 81, its supporting member 82 is provided with a block 83 shown in Fig. 4 as centrally disposed on the movable member 82, which block is threaded to receive a lead screw 53 which is rotatively mounted in a pair of bearings 93 secured to the machine frame and schematically shown in Fig. 4, one end of lead screw 53 is provided with a knob or the like 53k by which the lead screw may be turned to move contact finger 81 rectilineally relative to the conducting elements 86, 87; a stationary scale 80 is provided which is the counterpart of the circular scales 10, 20, etc. shown in connection with the rotary type of unit of the previous figures which is read by an index 81' affixed to the aforesaid block 83 which forms part of the movable contact member 82. Hence by adjustment of knob 53k, the contact finger 81 may be displaced to left or right of gap 89 to engage with one or the other of the conducting elements 86, 87 depending upon the direction which is desired to rotate the motor.

The circuit connections to the contact finger 81 and the conducting elements 86, 87 is the same as the connections already described with particular reference to Fig. 2. The master relay 72 is connected by lead 73. The conducting elements 86, 87 are connected to their respective relays 84, 85 by respective leads 24, 25 which terminate in brushes 24×, 25×, which are in sliding engagement with the tubular conducting elements 86, 87.

Figure 5:
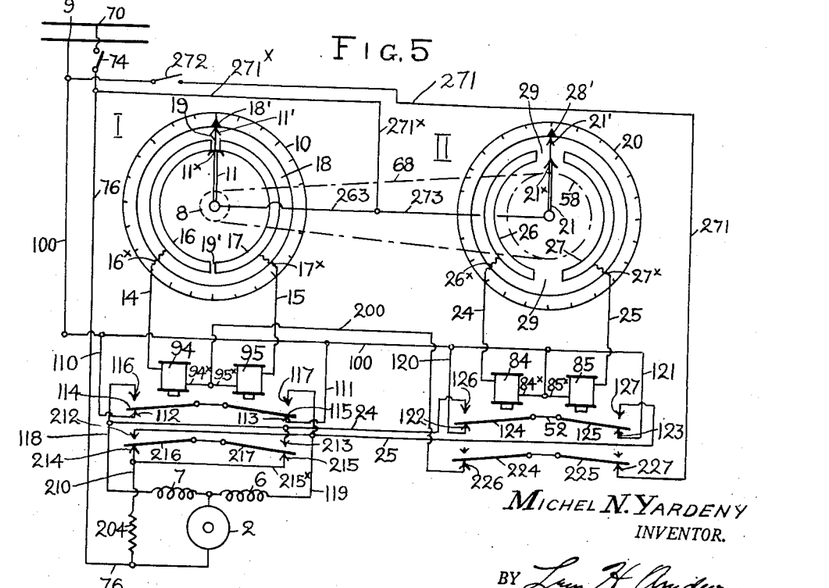
Fig. 5 is similar to Figs. 2 and 4 in that two pairs of relays are provided, but differs in a provision for slow-down by change in the motor field of a series motor; also, the master relay of Figs. 1-4 is replaced by an extra pair of armatures on the pair of complete revolution relays.

Turning now to the modification shown in Fig. 5, this arrangement differs from those of the previous figures in a number of respects, one of which is that the modification of Fig. 5 has a provision for reducing motor speed when the partial revolution unit I is functioning, which is different from the similar provision provided in the arrangements of Fig. 1 and Fig. 4, in the following respects: It will be recalled from previous description that the resistor elements 4, 5, provided in the modification of Fig. 4 (likewise in modification of Fig. 1), in the connections leading from the partial revolution unit I to the respective field windings 6, 7. The inter-position of the resistor elements reduces the motor speed by decreasing potential applied to the motor; this has the disadvantage that the decreased potential will lessen the power output of the motor. The object of the reduced speed element in Fig. 5 is to accomplish reduction of speed without, at the same time, diminishing torque output and is accomplished in the following manner: The circuit connections and arrangement of parts in Fig. 5 up to the connections from the respective conducting elements of the two units I, II to their respective relays 94, 95 and 84, 85 are similar to that shown in Fig. 2. However, unlike the corresponding relays 94, 95 and 84, 85 of Fig. 2 which each have a single armature, the corresponding relays of Fig. 5 each have two armatures. The inner (i. e. closest to the relay coils) armatures 114, 115 and 124, 125 are precisely the same as the identically designated armatures of Fig. 2 and function in the same manner. However, the outer armatures 216, 217 of the respective relays 94, 95 of the partial revolution unit I, are employed for the purpose of reducing motor speed during the functioning of the revolution unit I. In their unattracted positions as shown in Fig. 5, armatures 216 and 217 which are connected together by a short lead as shown, engage relay contacts respectively 214, 215 which are connected by a common lead 210, contact 215 being connected thereto by a lead 215ˣ, through a resistor 204 to the supply wire 76; in their attracted positions upon energization of their respective relays 94, 95 armature 216 engages relay contact 212 and armature 217 engages relay contact 213. Relay contact 212 is connected by lead 25 (which is the counterpart of lead 25 of Fig. 2) to relay contact 127 associated with the inner armature 125 of relay 85 of the complete revolution unit II; the other contact 213 of the partial revolution unit I is connected by lead 24 (which is the counterpart of lead 24, Fig. 2) to relay contact 126 associated with the inner armature 124 of relay 84 of unit II. Speed reduction without decreased torque is achieved by the outer armatures 216, 217 of the partial revolution unit I in the following manner: We will assume that the complete revolution unit II has completed its circuit, that the load has been moved the number of required complete revolutions and that the circuit to unit II has been broken, and that the circuit to partial revolution unit I had been completed, and that the insulator disc 18 of unit I had been pre-set for counter-clockwise motor rotation by being turned in that direction to engage contact arm 11, with segment 17; this will cause the energization of relay 95 in the manner already described in connection with Fig. 2 and will attract inner armature 115 to complete the circuit similar to circuit completed in Fig. 2 from one supply wire 100, lead 110, contact 112, unattracted armature 114, short inner lead between armatures, attracted armature 115, contact 117, lead 119, to field winding 6, through motor armature 2 and thus to the other supply wire 76. Energization of the said relay 95 will also attract the outer armature 217 which will complete a supplemental circuit effective to continue current through the other field winding 7, in the direction to cause magnetic flux of winding 7 to be added to that of winding 6. The supplementary circuit may be traced from the common tap of the field winding 6, 7 through field winding 7, lead 118, a short portion of lead 24, relay contact 213, attracted armature 217, unattracted armature 216, contact 214, lead 210, and resistor 204 to the other supply wire 76; it will thus be seen that the current flow through the principally energized field winding 6 which current flow is caused by a potential drop from, say, positive at supply wire 100, to a somewhat reduced potential at the common tap of the field winding, will be supplemented by the current flow through the other field winding 7, which flow is in the same direction in that it is under a potential drop from a relatively high potential at the common tap to a greatly reduced potential at the other or negative supply wire 76. It will be noted that resistor 204 could be eliminated and lead 210 directly connected to wire 76.

By reason of the increased field flux occurred by the fact both field winding 7 as well as 6 are energized during the functioning of the partial revolution unit I, the armature, the circuit to which is not affected, being in a stronger field, will be caused to run at a reduced speed. Moreover, by reason of the increased flux, the torque rather than being lowered as had been seen in connection with the reduced speed provision of Figs. 1 and 4, will be considerably increased despite the lowered speed.

The modification shown in Fig. 5 differs in other respects with the modifications described in connection with the previous Figs. 1 to 4 inclusive, in that the master relay 72 is replaced by other instrumentalities, more particularly a pair of outer armatures 224, 225 of relays 84, 85 associated with the complete revolution unit II. The said outer armature 224, 225 functions as a master relay in the following manner: When the complete revolution unit II is not functioning, its pair of relays 84, 85 will be deenergized (because of the alignment of contact arm 21, at gap 29 as already described) and the outer armatures 224, 225 will be in unattracted positions as shown in Fig. 5 in which they engage contacts 226, 227 respectively. Contact 227 is at the terminal end of a supply wire 271, extending back to the supply wire 100, leading back to one terminal 9 of the source of supply. The other relay contact 226 is at one end of a lead 200 the other end of which is connected by short leads 94ˣ and 95ˣ to the inner terminals of relays 94, 95 associated with the partial revolution unit I. Hence after the functioning of the complete revolution unit II (also in the event that the unit had not been pre-set for functioning), a circuit will be completed from supply terminal 9 via, the circuit just traced through the unattracted outer armature 224, 225 of the complete revolution unit II, to the inner terminals of the relays 94, 95 associated with the partial revolution unit I, completion of the circuit through the relays 94, 95 depending, as already described, upon which segment 16, 17 is displaced into engagement contact arm 11.

On the other hand, when complete revolution unit II is functioning and one of the other pair of relays 84, 85 is energized, the said circuit to the partial revolution relays 94, 95 will be broken by attraction of one or the other of the armatures 224, 225 which engage against blind contacts as shown. A lead 271ˣ branching off from wire 74 connects with two leads, a lead 273 leading to contact arm 21 of the complete revolution unit II, and a lead 263 connected to the contact arm 11 of the partial revolution unit I.

The advantage of the "master relay" arrangement shown in the modification of Fig. 5 over the previous arrangement shown in Figs. 1 to 4, employing a master relay 72, is that the two shafts of units I and II need not be insulated from one another as is required in the case where the master relay 72 is employed; this is necessitated by the fact that there are present two different circuits (and hence a difference of potential between them), viz, the circuit which passes through the coil of master relay 72 and is connected as already described to the contact arm 21 of the complete revolution unit II, and on the other hand the circuit passing through the armature 62 of relay 72 which as has already been described, is connected to the contact arm 11 of the partial revolution unit I. Comparing this arrangement with that shown in Fig. 5, it will be seen that in the latter case both contact arms 11 and 21 are connected to the same wire to wit; wire 271×.

Figure 6:
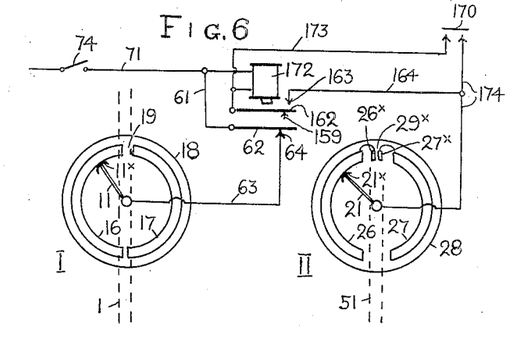
Fig. 6 is a fragmentary diagrammatic showing of an arrangement for pre-setting with the aid of the load motor.

It has been explained earlier that the insulated discs 18, 38 of the partial revolution units I, I' and the discs 28, 48 of the complete revolution units II, II' of the selectors I—II, I'—II' were pre-set by turning their knobs, respectively, 18×, 38×, 28×, 48× and noting the reading of the disc indices 18', 38', 28', 48' with respect to the stationary scales associated with each unit, respectively, 10, 30, 20, 40. Fig. 6 shows an arrangement for pre-setting the complete and partial unit discs of the various selectors without the need of observing the scales associated with the various selectors. There is required, however, a pair of scales (for complete and for partial revolution) which will indicate load movement, and which may be directly associated with the load or which may be the complete and partial scales associated with any one of the selectors, e. g. selector I'—II', Fig. 1. If the system, say that shown in Fig. 1, is to be modified for the type of pre-setting now to be described with reference to Fig. 6 the master relay of Fig. 1 would be replaced by the master relay 172 of Fig. 6, which has two armatures 62 and 162. Armature 62 is the same, in purpose and operation, as in the previous Figs. 1 to 4, namely, to complete a circuit, when the partial revolution unit I is to be operated, which may be traced from supply switch 74, supply wire 71, lead 61, unattracted armature 62 of deenergized relay 172, relay contact 64, and through lead 63, to contact arm 11. The other armature 162 when relay 172 is deenergized, rests on stop 153 (as shown), but when attracted, engages a relay contact 163 which is connected by a lead 164 to a wire 174. The supply wire 71 connects to one terminal of relay coil 172, the other terminal being connected by a wire 173 to a push button 170. Depression of push button 170 completes a circuit from said wire 173 to second wire 174 leading to contact arm 21 of the complete revolution unit II.

When various selectors, which may number more than the single selector shown in Fig. 6 and the two selectors of Fig. 1, are to be pre-set from whatever position their respective contact arm (11, 21, etc.) and discs (18, 28, etc.) happen to be, to different predetermined positions, the supply switch 74 is closed. This will complete a circuit through unattracted relay armature 62 to contact arm 11 of partial revolution unit I, which will cause rotation of the load motor in one direction or the other depending upon which segment 16, 17 is engaged with contact arm 11 of the partial revolution unit I, I', etc. of the particular selector being pre-set; it is assumed in Fig. 6, that selector I—II is to be pre-set. Depression of push button 170 completes a circuit through relay coil 172 which may be traced from supply wire 71, through coil 172, and via wire 173 to push button 170, from whence through wire 174 to contact arm 21 of the complete revolution unit II. Energization of relay 172 attracts armature 62 to open the circuit to the partial revolution unit I and to complete a holding circuit to contact arm 21 which may be traced from supply wire 71, through relay coil 172, attracted armature 162, relay contact 163, lead 164, wire 174 to contact arm 21. Completion of the circuit to contact arm 21 causes the motor to rotate in a direction depending upon which segment 26, 27 is engaged thereby. Assuming that it is segment 26 as shown in Fig. 6, the motor is rotated in a clockwise direction, turning contact arm 21 (and all other contact arms) in that direction, until its contact 21× leaves the upper end of segment 26.

In between the adjacent (and upper, as shown in Fig. 6) ends of segments 26, 27 is provided a pair of supplementary contacts, respectively, 26×, 27× which are spaced from the respective segment ends and connected thereto by short leads as shown. A short central gap 29× separates the two supplementary contacts 26×, 27×. This gap may be bridged by contact 21×.

When motor rotation turns contact arm 21 to reach either the gap between segment 26 and supplementary contact 26× (as would be the case in Fig. 6) or the gap between segment 27 and supplementary contact 27×, stopping the motor, the holding circuit to relay 172 is broken and its armatures return to unattracted positions (as shown in Fig. 6). The following manipulations are for the purpose of getting contact arm 21 centered at the central gap 29×: Switch 74 is closed and push button 170 is held depressed; this will energize the motor to bring contact arm 21 in gap 26—26×, in the instances, as shown in Fig. 6, when contact arm 21 engages segment 26 rather than segment 27, to stop the motor. Disc 28 is then turned slowly in one direction or the other; say, it is turned first in a counter-clockwise direction. This in the particular instance shown in Fig. 6, will engage supplementary contact 26× with contact arm 21 to cause the motor to be energized and to turn contact arm 21 in a clockwise direction until the contact arm engages both supplementary contact 27× as well as 26×; this will stop motor rotation and the turning of the contact arm, with the contact arm centered at central gap 29×. If, on the other hand, the disc is turned in a clockwise direction, segment 26 will be engaged with the contact arm, again causing clockwise turning of the arm until it reaches gap 26—26× and the motor and the arm stop turning; but in this case, the contact arm will be at gap 26—26×, rather than at central gap 29×, and the disc must again be turned in the opposite direction, which is counter-clockwise and will bring the contact arm at the central gap, as explained above. To quickly determine whether or not the contact arm is centered at central gap 29×, disc 28 is turned back and forward through a small angle—if this causes motor reversal, it indicates that the contact arm is centered at central gap 29×; if such test turning causes motor stopping, it indicates that the contact arm is not centered at 29× but is in either gap 26—26× or 27—27×.

With the contact arm 21 now centered at central gap 29×, disc 28 is then turned slowly—in order to keep contact arm 21 engaged with one or the other of the supplementary contacts 26×, 27× depending upon the particular direction of rotation—in the direction in which it is desired to move the load until load shaft 1 has made the number of revolutions required for the particular pre-setting, plus, approximately, the additional partial revolution, if any, that may be required for the particular pre-setting. Disc 28 of the complete revolution unit II is now in its pre-set position and contact arm 11 of the partial revolution unit I is in a position approximately correct for its disc 18. It is next necessary to bring disc 18 to its correct pre-set position, as follows: Switch 74 is now momentarily opened to deenergize master relay 172, in order to break the circuit to complete revolution unit II and to establish, when switch 74 is again closed, a circuit to partial revolution unit I. This causes contact arm 11 to turn, in the instance shown in Fig. 6, in a clockwise direction until it reaches and bridges gap 19. It should be noted that the centering of contact arm 11 at gap 19 of disc 18 in engagement with both segments 16, 17 is similar to the afore-described centering of contact arm 21 at gap 29× in engagement with both supplementary contacts 26×, 27×. In other words, movement of disc 18 will cause contact arm 11 to follow it, just as contact arm 21 at central gap 29× followed disc 28. Disc 18 is then turned to the precise angle corresponding to the partial revolution required for the particular pre-setting. The purpose of "coupling" contact arm 11 to disc 18 so as to follow its movement, is to move the load concomitantly and thus serves as a convenient indicating means to aid the pre-setting operation.

A system, such as those shown in Figs. 1 to 5, modified to include the presetting arrangement of Fig. 6, would be operated in moving the load to pre-set end positions in the manner already described except that push button 170 is momentarily depressed every time a different selector switch A, A', etc., Fig. 1, is closed.

Although only a single selector I—II is shown in Figs. 2 to 6, it will be understood that a control apparatus according to this invention may have more than a single selector, in which case the plurality of selectors may be arranged for individual operation in the manner shown in Fig. 1 and hereinabove described.

The partial revolution unit I, I' is capable of partial revolution load movement from 0° to close to 180° in either direction; this limitation in partial revolution load movement is due to the presence of two directional segments e. g., 16, 17 (unit I) on disc 18, each occupying somewhat less than half a circle. In order that the segments 16, 17 (I), 36, 37 (I') may be as long as possible, so as to provide for partial revolution movement as close to 180° as possible, the gaps 19', 39' are made as narrow as possible, and are, therefore narrower than gaps 19, 39 (see Fig. 1, for example). To pre-set for a partial revolution greater than 180°, say 250°, an additional half revolution would be pre-set in the complete revolution unit II, the difference, 70° in the example, being pre-set in the partial revolution unit I.

I claim:

1. In control apparatus for moving a load through one or more and/or a partial revolution in a predetermined direction and to a predetermined position, in combination, a complete revolution unit and a partial revolution unit, each unit comprising a pair of relatively movable members, one of the members having a pair of electrical conducting elements separated by a gap, the other member having a contact element engageable with the said conducting elements, a motor having a pair of reversing field windings for moving the load, individual ones of the said windings being connected to respective ones of the said conducting elements of the two units, one of the said pair of members of the said complete revolution unit being selectively adjusted a number of unit distances equal to the number of revolutions through which the load is to be moved, to cause displacement between its said gap and contact element and engagement thereof with one of the said conducting elements for rotating the motor in the said predetermined direction, one of the said pair of members of the said partial revolution unit being selectively adjusted an extent depending upon the partial revolution through which the load is to be moved, to cause displacement between its said gap and contact element and engagement thereof with its conducting element corresponding to the said engaged conducting element of the complete revolution unit, for continuing the said motor rotation in the said predetermined direction, a master relay having a coil, a single contact, and an armature engaging the said contact in the deenergized condition of the relay, means connecting the said relay armature and contact element of the partial revolution unit in circuit with a current source, means connecting the said relay coil and contact element of the complete revolution unit in circuit with the current source to complete a circuit, through the said engagement of its contact element with the said one of its conducting elements, to the respective motor winding to rotate the motor in the said predetermined direction and to energize the said master relay, energization of the relay breaking the first said circuit to the partial revolution unit, means driven by the said motor for moving the other of the said pair of partial revolution members at a rate equal to the rate of load movement and for moving the other of the said pair of complete revolution members at a rate to traverse one said unit distance for each revolution of the said partial revolution unit, the said members of both units being moved by the motor in a direction to cause alignment of contact element and gap of the respective units, said alignment of the contact element and gap of the complete revolution unit stopping motor rotation after the required number of complete revolutions and deenergizing the master relay to complete the first said circuit to the partial revolution unit, whereat a circuit is completed through the contact element and engaged conducting element of the partial revolution unit to the said motor winding to continue motor rotation in the said predetermined direction, subsequent alignment of the contact element and gap of the partial revolution unit stopping motor rotation after the desired partial revolution.

2. The combination according to claim 1 wherein the said complete revolution and partial revolution units constitute one selector, further provided with a selector for each particular position to which it is desired to move the load, switches in the said connections between the motor winding and respective ones of the conducting elements of the two units of each of the said plurality of selectors, and manipulative means, one for each selector, for operating as a unit the said switches in the conducting element connections of both complete and partial revolution units thereof.

3. The combination according to claim 1 wherein the said gap between the pair of electrical conducting elements of the complete revolution unit is sufficiently wide to enable the complete revolution selectively adjusted member to traverse substantially half the distance of the gap during the traverse of the partial revolution selectively adjusted member about a half revolution of the partial revolution unit.

4. The combination according to claim 1 wherein the said gap between the pair of electrical conducting elements of the partial revolution unit is sufficiently wide to enable the partial revolution selectively adjusted member to be received therein without engaging the adjacent conducting elements whereby the said pair of field windings are deenergized to stop the motor.

5. The combination according to claim 1 wherein the said gap between the pair of electrical conducting elements of the partial revolution unit is relatively narrow to enable the partial revolution selectively adjusted member to bridge the gap and engage the adjacent conducting elements whereby the said pair of field windings are energized to stop the motor.

6. The combination according to claim 1 wherein the said gap between the pair of electrical conducting elements of the partial revolution unit is relatively narrow to enable the partial revolution selectively adjusted member to bridge the gap and engage the adjacent conducting elements, and wherein a resistor element is provided in each of the said connections between the pair of motor windings and the respective conducting elements of the partial revolution unit to reduce the current through the circuit, completed by the said bridging of the gap by the partial revolution selective adjusted member upon each revolution thereof during the functioning of the complete revolution unit, of the motor winding energized by the complete revolution unit for a particular direction of rotation through the other winding.

7. The combination according to claim 1 where a resistor element is provided in each of the said connections between one of the motor windings and the respective conducting elements of the partial revolution unit to reduce the current to the respective motor winding to lower speed of motor rotation during functioning of the partial revolution unit.

MICHEL N. YARDENY.

REFERENCES CITED

The following references are of record in the file of this patent:

UNITED STATES PATENTS

| Number | Name | Date |
|---|---|---|
| 1,563,994 | Kaminski | Dec. 1, 1925 |
| 2,194,170 | Newell | Mar. 19, 1940 |
| 2,442,739 | Yardeny | June 1, 1948 |